Patented Aug. 16, 1938

2,126,976

UNITED STATES PATENT OFFICE 2,126,976

XANTHATION OF CELLULOSE TO FORM VISCOSE

George A. Richter and Everett W. Lovering, Berlin, N. H., assignors to Brown Company, Berlin, N. H., a corporation of Maine No Drawing. Application July 14, 1937, Serial No. 153,688

10 Claims. (Cl. 260—100)

This invention relates to the xanthation of cellulose to form viscose or cellulose xanthate solution by a so-called one-step xanthating process or reaction involving the admixture all at once of the various ingredients requisite for the reaction, namely, the cellulose, caustic soda solution, and liquid carbon bisulphide.

In order to realize the desired substantially complete reaction between the ingredients entering into a one-step xanthating reaction, it is necessary to ensure intimacy of contact between the liquid carbon bisulphide and the cellulose particles or fibers that are soaked with and/or suspended in the caustic soda solution. Because carbon bisulphide is substantially insoluble in caustic soda solution, it is advantageous, besides mixing the ingredients as thoroughly as possible in the course of their reaction, to induce dissolution of the carbon bisulphide to some extent in the caustic soda solution or to induce fine particle size emulsification thereof in the caustic soda solution and thereby to establish the intimacy of contact between the carbon bisulphide and the cellulose particles or fibers that conduces to viscose or cellulose xanthate solution of the desired freedom from residual unxanthated or incompletely xanthated cellulose.

In accordance with the present invention, cellulose is xanthated to form viscose or cellulose xanthate solution by admixing with the caustic soda solution in which the cellulose fibers or particles are suspended, liquid carbon bisulphide containing a solute in such amount that the specific gravity of the carbon bisulphide solution approximates that of the caustic soda solution. By so doing, it is easy to establish the intimate contact desired between the carbon bisulphide and cellulose particles to be xanthated, irrespective of whether the solute present in the carbon bisulphide is miscible or immiscible with the caustic soda solution serving as the soaking and/or suspending medium for the cellulose particles. Thus, even when the solute present in the carbon bisulphide is an organic liquid immiscible with the caustic soda solution, its admixture with liquid carbon bisulphide in amount to yield a liquid mixture of a specific gravity approximating or substantially equal to that of the caustic soda solution means that the mixture of carbon bisulphide solution is readily emulsifiable or dispersible in the caustic soda solution into microscopically minute particles, especially in the presence of a small amount of soap or other emulsifying agent; and, by virtue of the intimate contact thus had between the finely emulsified carbon bisulphide and the suspended cellulose particles, xanthation of the cellulose particles proceeds smoothly to completion in a comparatively short period, wherefore the resulting viscose or cellulose xanthate solution is of the desired filterability or freedom from residues and is otherwise suitable for its intended purpose.

The process hereof may be practiced by adding to the liquid carbon bisulphide various organic liquids or the like that are miscible with the carbon bisulphide and that are not reactive materially with the caustic soda solution used for soaking and/or suspending the cellulose particles. Typical of such liquids or solutes as are serviceable in the liquid carbon bisulphide are the liquid hydrocarbons or very light petroleum oils, such as toluene, the ethers, such as isopropyl ether, the lower ketones or aldehydes, such as acetone, the lower alcohols or alcohol esters, such as ethyl acetate, etc. It should be understood that the amount of gravity-lowering liquid admixed with the liquid carbon-bisulphide is subject to wide variation, depending upon the specific gravity of the particular liquid used and the specific gravity of the particular caustic soda solution entering into the one-step zanthating reaction. In any event, the amount of gravity-lowering liquid dissolved in the carbon bisulphide is such as to yield a solution or mixture of a specific gravity approximating that of the caustic soda solution participating in the one-step xanthating reaction.

Carbon bisulphide has a specific gravity of 1.26 at about 20° C., which corresponds to the specific gravity of a caustic soda solution of about 23% strength at about the same temperature. However, it is generally desirable to use caustic soda solution of distinctly lower strength for soaking or suspending the cellulose particles or fibers to be xanthated in a one-step reaction, especially when the viscose or cellulose xanthate solution is to contain approximately equal proportions of both the caustic soda and cellulose, since the use of caustic soda solution of materially greater than about 16% strength for producing in a one-step reaction viscose of approximately the same causticity and cellulose content bespeaks the use of a volume of caustic soda solution inadequate to effect the desired soaking or suspension of the cellulose, in consequence of which the resulting soda-cellulose is too stiff or solid for proper physical admixture and reaction with the usual amount of liquid carbon bisulphide. It is thus seen that the addition of gravity-lowering liquid to the liquid carbon bisulphide has especial utility in a one-step xanthating reaction involving the use of caustic soda solution up to about 16% strength, such as is distinctly desirable for making viscose of approximately the same causticity and cellulose content. Viscose of such latter character having a causticity and cellulose content of about 6% to 7% each is generally preferred for artificial silk and film manufacture. Although the present invention is thus of especial importance in producing viscose for artificial silk and film manufacture, it is applicable also in the prepartion of viscose for cellulose xanthate solution containing markedly different proportions of caustic soda and cellulose, including proportions of caustic soda and/or cellulose as high as, say, about 10% and as low as, say, about 1%. A relatively dilute viscose may, for example, be of value for impregnating paper, cloth, or other material. Such viscose lends itself to preparation satisfactorily by the one-step xanthating process hereof even with comparatively high-viscosity cellulose, whereas, on the other hand, it is usually preferable to use comparatively low-viscosity cellulose in the one-step xanthating process hereof for the preparation of much stronger viscose, for instance, viscose of a cellulose content upwards of about 6%.

While the inventive principles hereof may, as already indicated, be embodied in numerous and widely variant specific procedures, it might be well to describe a typical procedure found to yield viscose syrup practically free from residual cellulose fiber or particles and hence suitable for such purposes as making artificial silk, films, and other end-products. The cellulose fiber used as raw material may be of any composition suitable for viscose to serve in artificial silk manufacture, but it is preferable to use fiber of the low solution viscosity and other characteristics set forth in application Serial No. 148,304 filed June 15, 1937 by George A. Richter. Thus, the fiber may have a cuprammonium solution viscosity of 0.3 poises as defined in that application; and its composition may also conform advantageously to the various standards laid down in that application. Caustic soda solution of 16% strength may be admixed with the fiber in a suitable mixing and reacting vessel in proportion or volume calculated to lead to a finished viscose containing approximately equal proportions of caustic soda and cellulose. Such proportion or volume of caustic soda solution when mixed with the cellulose fiber is productive of a fairly stiff paste or soda-cellulose mixture. The soda-cellulose paste or mixture is preferably cooled to a temperature of about 15° C. and, while being constantly stirred, a carbon bisulphide solution of toluene and oleic acid of the appropriate specific gravity may be added thereto, namely, a solution consisting of about 80% carbon bisulphide, 19.9% toluene and 0.1% oleic acid. The carbon bisulphide solution is added in volume to furnish about 40% carbon bisulphide, based on the dry weight of the cellulose, for the xanthating reaction. Upon continuing the stirring or mixing of the ingredients at about 15° C. for a period of three hours, a viscose or cellulose xanthate solution substantially free from residual fiber or unreacted cellulose particles is realized. It might be noted that during the first stages of the mixing operation, after the carbon bisulphide solution has been added to the soda-cellulose paste, a rather thick, creamy composition is developed from the mixed ingredients comprising the cellulose, the emulsified carbon bisulphide solution, and the caustic soda solution. When viewed under the microscope, the dispersed carbon bisulphide solution appears as minute droplets of a diameter of about 2 to 1 microns or less. Such fine particle size emulsification is a reflection of the approximately same specific gravity (1.18) of the 16% caustic soda solution constituting the continuous phase of the emulsion and the carbon bisulphide constituting the disperse phase of the emulsion. As the mixing and reaction of the ingredients continue and the cellulose and carbon bisulphide are consumed by reaction to form viscose, the emulsion of carbon bisulphide solution is broken and the toluene previously dissolved in the carbon bisulphide remains, as essentially the only unreacted ingredient, dispersed in the resulting viscose or cellulose xanthate solution. The slight amount of oleic acid dissolved along with the toluene in the carbon bisulphide, although unessential to satisfactory performance of the process hereof, assists in promoting fine particle size emulsification of the carbon bisulphide solution of toluene, since it is saponified promptly by the caustic soda solution and thus provides emulsifying agent in the form of sodium oleate.

The viscose or cellulose xanthate solution prepared as hereinbefore described may be diluted with water to the causticity and cellulose content desired for making artificial silk, films, or other end-products. The viscose may, as ordinarily, be ripened to the desired degree preparatory to being used in the manufacture of the desired end-products; and, if ripening is performed at elevated temperature, say, about 40° C., the toluene may be readily distilled, if desired, from the viscose under vacuum and be recovered for reuse. In some instances, such distillation and recovery of the toluene from the viscose may be effected at lower temperature, say 20° C.

There are various carbon bisulphide solutions that might be used in lieu of a carbon bisulphide-toluene mixture for xanthating cellulose to good advantage in the one-step xanthating process hereof. Thus, a carbon bisulphide solution consisting of 88% carbon bisulphide and 12% isopropyl ether and having a specific gravity of about 1.14 was used satisfactorily in xanthating cellulose substantially completely in caustic soda solution of 12% strength, the conditions of xanthation, other than caustic soda solution strength, being substantially similar to those contained in the specific example of procedure herebefore given. Another carbon bisulphide solution employed successfully in the one-step xanthating process hereof was one consisting of 75% carbon bisulphide, 24.9% acetone, and 0.1 oleic acid and applied to a soda-cellulose mixture containing caustic soda solution of 14% strength, such caustic soda solution being of a specific gravity approximating that of the carbon bisulphide solution. In the case of a carbon bisulphide solution of acetone, the acetone serves not only to reduce the specific gravity of the carbon bisulphide to the desired degree, but, being miscible with caustic soda solution as well as with carbon bisulphide, it functions as a carrier or vehicle to induce quick and substantially uniform diffusion of the carbon bisulphide through the caustic soda solution to the bodies of the individual cellulose particles or fibers, thereby fostering complete xanthation of the cellulose by the carbon bisulphide. There are other organic liquids useful for the purposes hereof that are akin to acetone, insofar as concerns their miscibility with both carbon bisulphide and caustic soda solution. Among such other organic liquids is ethyl acetate which, however, tends to hydrolyze somewhat in caustic soda solution to form ethyl alcohol and sodium acetate. However, this hydrolysis is so limited that insufficient sodium acetate is generated to affect significantly the stability or other qualities desired in the resulting viscose.

It is to be understood that not only are the inventive principles hereof applicable in the preparation of viscose or cellulose xanthate solutions of various causticities and cellulose contents but further that the one-step xanthating reaction hereof may be effected at various temperatures, say, from about 0° C. to about 25° C., and in the presence of caustic soda solutions of various strengths, say, of about 6% to 16% strength. Depending upon such factors as the kind of cellulose used as raw material and the temperature, caustic soda concentration, and other conditions maintained during the one-step xanthating reaction, various percentages of liquid carbon bisulphide may be employed in such reaction, for instance, about 20% to 50%, based on the dry weight of cellulose; and the period of reaction may range from one to eight hours. The cellulose employed as raw material may vary in its composition, so long as it is of a composition or grade leading to viscose or cellulose xanthate solution of a quality appropriate for its destined use. Thus, bleached sulphite and other chemical wood pulp, wood pulp refined to higher alpha cellulose content, cotton linters, or the like may be employed in bulk or shredded condition, as pulpboard, or in any other suitable form. While cellulose fiber of various solution viscosities may be employed herein, it is preferably to use fiber of low solution viscosity and more especially fiber of a solution viscosity less than 1, as defined in the aforementioned Richter application, in producing viscose of the particular composition desired in artificial silk and film manufacture.

The organic medium serving herein to lower the specific gravity of the liquid carbon bisulphide entering into a one-step xanthating reaction need not necessarily be volatile and hence lend itself to distillation from the viscose or natural vaporization from the end-product produced from the viscose. Indeed, such organic medium may be a hydrocarbon oil, wax, or other material whose boiling point is much higher than that of water and which hence remains dispersed in the viscose and in the artificial silk or other regenerated cellulose product manufactured from the viscose. The use of high boiling point organic liquid, for instance, para cymene (boiling point 176° C.), or normally solid material for reducing the specific gravity of the carbon bisulphide serving as the xanthating reagent in a one-step xanthating reaction enables the realization of dull or so-called "delustered" rayon yarns wherein such liquid or solid material appears as a dulling or delusterizing agent. A mixture consisting of 80% carbon bisulphide and 20% para cymene has a specific gravity approximating that of caustic soda solution of 14% strength and may hence be added pursuant to the instant invention to a soda-cellulose mixture containing caustic soda solution of such strength. It has already been indicated that sodium oleate may be formed in the sphere of the one-step xanthating reaction to promote the desired fine particle size emulsification of the carbon bisulphide solution. Instead of so doing, however, it is possible to add an already-prepared soap to any one or a mixture of ingredients to undergo reaction and thereby to provide emulsifying agent in the sphere of reaction for the carbon bisulphide solution. The soap should, of course, be formed or added in such small amount to the mixed reacting ingredients as not to separate out from such ingredients or affect the quality of the resulting viscose. Various wetting-out agents, such as "Nekal", might be used to promote the desired fine particle size emulsification of the carbon bisulphide solution employed herein as a xanthating reagent in a one-step xanthating reaction at a specific gravity approximating that of the caustic soda solution participating in such reaction.

It might be noted that the cellulose component of a mixture of cellulose fiber and caustic soda solution affects the specific gravity of the mixture, since cellulose has a specific gravity of about 1.5, whereas the caustic soda solutions employed herein are preferably of such strength as to be of distinctly lower specific gravity. In the absence of entrained air, therefore, the mixture of cellulose and caustic soda solution (i. e., the soda-cellulose paste) produced herein has a specific gravity higher than that of its caustic soda solution component. However, the process hereof may be performed with caustic soda solution of such strength and with the entrainment of sufficient air in the mixture of cellulose and caustic soda solution that the mixture has a specific gravity substantially no greater than its caustic soda solution component and, in some instances, even less. A soda-cellulose paste of such latter specific gravity is stable in the sense that the fibers or cellulose particles tend to remain substantially uniformly dispersed in the caustic soda solution; and, since the carbon bisulphide solution admixed with the paste is of a specific gravity approximating that of the caustic soda solution, there are thus provided conditions favoring a smooth or substantially uniform xanthating reaction on the dispersed cellulose fibers or particles to produce the desired viscose or cellulose xanthate solution.

We claim:

1. In a process involving the formation of viscose by the admixture of cellulose, caustic soda solution, and liquid carbon bisulphide, that improvement which comprises dissolving in said liquid carbon bisulphide a material, which is soluble therein, of a specific gravity and in an amount to yield a carbon bisulphide solution of a specific gravity approximating that of said caustic soda solution admixed therewith in the formation of said viscose.

2. In a process involving the formation of viscose by the admixture of cellulose, caustic soda solution, and liquid carbon bisulphide, that improvement which comprises dissolving in said liquid carbon bisulphide an organic liquid, which is miscible therewith, of a specific gravity and in an amount to yield a carbon bisulphide solution of a specific gravity approximating that of said caustic soda solution admixed therewith in the formation of said viscose.

3. In a process involving the formation of viscose by the admixture of cellulose, caustic soda solution, and liquid carbon bisulphide, that improvement which comprises dissolving in said liquid carbon bisulphide an organic liquid, which is miscible therewith and also with said caustic soda solution, of a specific gravity and in an amount to yield a carbon bisulphide solution of a specific gravity approximating that of said caustic soda solution admixed therewith in the formation of said viscose.

4. In a process involving the formation of viscose by the admixture of cellulose, caustic soda solution, and liquid carbon bisulphide, that improvement which comprises dissolving in said liquid carbon bisulphide an organic liquid, which is miscible therewith but is immiscible with said caustic soda solution, of a specific gravity and in an amount to yield a carbon bisulphide solution of a specific gravity approximating that of said caustic soda solution admixed therewith in the formation of said viscose.

5. In a process involving the formation of viscose by the admixture of cellulose, caustic soda solution, and liquid carbon bisulphide, that improvement which comprises dissolving in said liquid carbon bisulphide an organic liquid, which is miscible therewith, of a specific gravity and in an amount to yield a carbon bisulphide solution of a specific gravity approximating that of said caustic soda solution admixed therewith in the formation of said viscose; and admixing said cellulose, caustic soda solution, and carbon bisulphide solution in the presence of an agent inducive of fine particle size emulsification of said carbon bisulphide solution in said caustic soda solution.

6. In a process involving the formation of viscose by the admixture of cellulose, caustic soda solution, and liquid carbon bisulphide, that improvement which comprises dissolving in said liquid carbon bisulphide a gravity-lowering material, which is soluble therein, in an amount to yield a carbon bisulphide solution of a specific gravity approximating that of said caustic soda solution admixed therewith in the formation of said viscose, said gravity-lowering material being substantially unreactive with either said liquid carbon bisulphide or said caustic soda solution.

7. In a process involving the formation of viscose by the admixture of cellulose, caustic soda solution, and liquid carbon bisulphide, that improvement which comprises dissolving in said liquid carbon bisulphide a gravity-lowering, organic liquid, which is miscible therewith, in an amount to yield a carbon bisulphide solution of a specific gravity approximating that of said caustic soda solution admixed therewith in the formation of said viscose, said gravity-lowering organic liquid being substantially unreactive with either said liquid carbon bisulphide or said caustic soda solution.

8. In a process involving the formation of viscose by the admixture of cellulose, caustic soda solution, and liquid carbon bisulphide, that improvement which comprises dissolving in said liquid carbon bisulphide a gravity-lowering, organic liquid, which is miscible therewith, in an amount to yield a carbon bisulphide solution of a specific gravity approximating that of said caustic soda solution admixed therewith in the formation of said viscose, said gravity-lowering organic liquid being substantially unreactive with either said liquid carbon bisulphide or said caustic soda solution and being more volatile than water; and, after said viscose has been formed, distilling said gravity-lowering, organic liquid from the viscose.

9. In a process involving the formation of viscose by the admixture of cellulose, caustic soda solution, and liquid carbon bisulphide, that improvement which comprises admixing the cellulose with caustic soda solution of such strength and with the entrainment of sufficient air to produce a mixture whose specific gravity is substantially no greater than that of its caustic soda solution component; and admixing with the resulting mixture liquid carbon bisulphide containing dissolved therein a gravity-lowering material, which is soluble therein, in amount to provide a carbon bisulphide solution of a specific gravity approximating that of said caustic soda solution.

10. In a process involving the formation of viscose by the admixture of cellulose, caustic soda solution, and liquid carbon bisulphide, that improvement which comprises admixing the cellulose with caustic soda solution of such strength and with the entrainment of sufficient air to produce a mixture whose specific gravity is substantially no greater than that of its caustic soda solution component; and admixing with the resulting mixture liquid carbon bisulphide to form viscose.

GEORGE A. RICHTER.
EVERETT W. LOVERING.